(12) United States Patent
Abbott (10) Patent No.: US 6,701,987 B1
(45) Date of Patent: Mar. 9, 2004

(54) TREAD STIFFENING SUPPORT RIBS FOR RUNFLAT TIRE

(75) Inventor: John Ronald Abbott, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/913,193

(22) PCT Filed: Apr. 12, 1999

(86) PCT No.: PCT/US99/07963

§ 371 (c)(1),
(2), (4) Date: Aug. 9, 2001

(87) PCT Pub. No.: WO00/61390

PCT Pub. Date: Oct. 19, 2000

(51) Int. Cl.[7] .......................... B60C 9/18; B60C 17/00; B60C 17/08; B60C 9/00

(52) U.S. Cl. ...................... 152/516; 152/517; 152/526; 152/532; 152/538; 152/196

(58) Field of Search .................... 152/195, 196–202, 152/458, 516, 517, 518, 519, 520, 526, 532, 538

(56) References Cited

U.S. PATENT DOCUMENTS 4,111,249 A    9/1978  Markow
4,691,752 A  * 9/1987  Kabe et al. .................. 152/527
5,427,176 A  * 6/1995  Hayashi et al. ............. 152/517
5,535,800 A  * 7/1996  Abbott ........................ 152/517
6,012,498 A  * 1/2000  Koch ........................... 152/197

FOREIGN PATENT DOCUMENTS

| | | | |
|---|---|---|---|
| DE | 3401016 | * | 2/1985 |
| EP | 0605177 | | 7/1994 |
| EP | 0836956 | | 4/1998 |
| EP | 0853009 | | 7/1998 |
| FR | 2425334 | | 12/1979 |
| JP | 63-141809 | | 10/1988 |
| JP | 01-237204 | * | 9/1989 |
| WO | WO98/54014 | | 12/1998 |
| WO | WO99/36278 | | 7/1999 |
| WO | WO99/48710 | | 9/1999 |
| WO | WO00/02740 | | 1/2000 |

* cited by examiner

Primary Examiner—Jeff H. Aftergut
Assistant Examiner—Justin Fischer
(74) Attorney, Agent, or Firm—Howard M. Cohn (57) ABSTRACT

A pneumatic tire (10) incorporates a plurality of parallel-aligned, tread-stiffening support members (23) typically disposed laterally between the tread (12) and the ply structure (16). The support members (23) inhibit lateral and circumferential tread lift during runflat operation. Support members (23) can each be a monolithic rib (22) made of a fiber reinforced plastic material. An alternative layered rib (24) has two outer layers (40, 44) of a fiber reinforced plastic material while the central layer (42) is an elastomer.

20 Claims, 4 Drawing Sheets

TREAD STIFFENING SUPPORT RIBS FOR RUNFLAT TIRE

TECHNICAL FIELD

The present invention relates to pneumatic radial-ply runflat tires and in particular to runflat tire construction that reduces lateral and circumferential tread lift during runflat operation.

BACKGROUND OF THE INVENTION

Designers of pneumatic tires have devised various methods by which to make a tire that is capable of providing acceptable performance following sudden, unexpected deflation, such as a tire puncture. Under such conditions, the goal of the tire designer is to design a tire able to provide adequate vehicle handling and safe continued operation over a distance from the place where the tire has lost its pressure to a place desired by the driver, such as a service station where the tire can be repaired or replaced.

A pneumatic tire designed for sustained operation under conditions of unpressurization or underpressurization is generally called an extended mobility tire (EMT) or simply a runflat tire. The latter term refers to the tire's ability to be driven while uninflated or in what would generally be called a "flat" condition. A conventional pneumatic tire will collapse upon itself, becoming flat, when it is uninflated and carrying the weight of a vehicle. Such a tire's sidewalls buckle axially outward in the portion of the tire adjacent to the ground-contacting portion of the tread, making the tire "flat."

A tire's sidewalls are the portion of a tire usually having the lowest resistance to deformation under vertical loading. Therefore the most widely used design methods used to achieve acceptable extended mobility or runflat capability involve various methods by which to reinforce the sidewalls, giving them sufficient strength and rigidity to support the wheel load when the tire is uninflated. Such reinforced sidewalls do not collapse or buckle onto themselves.

State-of-the-art reinforced sidewalls contain one or more circumferentially disposed wedge inserts within each sidewall region, such as between the carcass plies. Thus each sidewall is thickened in such a way that its overall thickness in the region between the bead and the tread shoulder is more or less uniform. The one or more circumferentially disposed wedge inserts in each sidewall are generally crescent-shaped in cross-sectional view, in order to conform to the internal shape of the sidewalls. Such wedge reinforced sidewalls, when operated in the uninflated condition, experience a net compressive load in the region of the sidewall. And, more specifically, the bending stresses on the sidewalls are such that the axially outwardmost portions of the reinforced sidewalls experience tensile forces while the axially inward portions experience compression stresses during runflat operation.

The bending forces that act upon the reinforced sidewalls of an uninflated EMT or runflat tire lead to the transmission of bending forces from the sidewall regions to the ground-contacting portions of the tread.

The result is that the uninflated EMT tends to have a compressed tread footprint. More specifically, the transmission of bending forces from the sidewalls to the tread region tend to cause the central portions of the tread to buckle upwards. The term or art used to refer to the upwards buckling of the tread is tread lift.

The tread lift arises from compressive loading in both the lateral and circumferential directions. The central portion of the tread accordingly tends to lose contact with the ground during runflat operation, having consequent adverse effects upon vehicle handling, especially during high speed operation.

Tread lift also takes place in the circumferential direction. The forces acting upon the ground-contacting portion of the tread are such that the bending forces that act upon the tread in the frontmost and rearmost portions of the footprint area act in such a way that, as viewed from the side of the tire, i.e., in the axial direction, the central region of the ground-contacting portion of the tread tends to rise off the ground. Thus tread lift has both lateral and circumferential components.

One method used to stiffen the tread against lateral tread lift employs the use of a metal-reinforced first radial carcass ply which resists the tensile forces that arise during lateral tread lift. Another method by which to inhibit tread lift involves the use of decoupling grooves in the lateral-most regions of the tread. The decoupling grooves inhibit the transmission of bending forces from the sidewalls to the central portions of the tread. The bottoms or radially inward-most portions of the decoupling grooves act as hinges, allowing the sidewalls to deform without affecting the adjacent tread region. An example of a runflat tire design incorporating decoupling "shoulder grooves" is described in Goodyear's Patent Application PCT/US98/00717, filed Jan. 15, 1998 and having a common assignee with the present application.

Another method by which to inhibit runflat tread lift is described in Goodyear's Patent Application PCT/US98/14452, filed Jul. 10, 1998 and having a common assignee with the present application, wherein a lateral-tensile-stress bearing fabric underlay is deployed radially inward of the breaker package. The laterally aligned (or axially aligned) fibers of such a fabric underlay might or might not be prestressed in tension to inhibit upward buckling of the central portion of the tread of an uninflated EMT or runflat tire. Yet another method by which to minimize runflat tread lift is described in Goodyear's Patent Application PCT/US98/06004, filed Mar. 26, 1998 and having a common assignee with the present application, wherein a "tread wedge" is used to thicken the structures underlying the tread and thus inhibit tread lift during runflat operation.

With regard to the circumferential component of tread lift during runflat operation, one method of managing it is described in the aforementioned Goodyear's Patent Application PCT/US98/06004 wherein a fabric underlay comprising more or less circumferentially aligned cords inhibits tread lift in the circumferential direction.

As always in the design of an EMT or runflat tire, the goals of the tire design include the minimizing of tire mass and provision of good riding comfort under normal inflated operation while also providing adequate safe vehicle handling during uninflated operation. Long runflat service life is also a design goal.

OBJECTS OF THE INVENTION

It is an object of the present invention to provide a radial tire as defined in one or more of the appended claims and, as such, having the capability of being constructed to accomplish one or more of the following subsidiary objects.

One object of the present invention is to provide a runflat radial tire that is resistant to both lateral and circumferential tread lift during runflat operation.

Another object of the present invention is to provide a runflat radial tire that is relatively light in weight.

Another object of the present invention is to provide a runflat tire that is able to provide good vehicle runflat handling and an extended runflat service life.

Still another object of the present invention is to provide a runflat tire having a reduced heat generating potential within the tread reinforcing structures during both normal inflated, high-speed operation and especially during runflat operation.

Yet another object of the present invention is to provide a plurality of tread stiffening support that provide puncture protection from cuts and objects picked up on the road.

SUMMARY OF THE INVENTION

The present invention relates to a pneumatic radial ply tire having a tread, a carcass comprising a radial ply structure, an inner liner and two sidewalls each reinforced by one or more wedge inserts, a belt structure located between the tread and the radial ply structure and a plurality of parallel-aligned ribs lying laterally across and radially inward of the tread and radially inward or outward of the belt structure. The length of each rib of the plurality of ribs is approximately equal to the width of the belt structure. In one embodiment, each rib is made of a monolithic, fiber-reinforced plastic material from the class of plastic matrix materials that includes thermoplastics, such as polyetherirnide, polyetheretherketone and polyphenylene sulfide and thermosets, such as polyester and epoxy. The fiber-reinforcing materials are of the class of high-modulus materials that includes carbon fiber, fiberglass and aramid filaments. Preferably, the formulation of the fiber-reinforced plastic material is between about 30 percent to 70 percent by weight of reinforcement material and the remainder primarily being the plastic matrix. The reinforcing fibers within each monolithic rib are preferably unidirectional, being aligned with the axis, extending along the length of the rib. The preferred relationship between the thickness and width of each rib is such that the thickness is between 10 percent and 45 percent of the width of the rib. The minimum preferred circumferential spacing between each rib in the plurality of ribs is between 50 percent and 200 percent of the width of the ribs on either side of the spacing. An alternative location of the plurality of ribs is beneath or radially inward of the tread and belt structure and within the ply structure.

An alternative embodiment incorporates a rib made of three layers of which the first and third layers, i.e., the two outermost layers, are made of a reinforced plastic material as previously described with regard to the first embodiment. The middle layer of the three rib layered rib is made from an elastomeric material, such as urethane or rubber, to allow the ribs to endure shear stresses associated with the tread deflections during normal or runflat operation of the tire.

Other benefits and advantages of the invention will become apparent to those skilled in the art to which it pertains upon a reading and understanding of the following detailed specification.

BRIEF DESCRIPTION OF THE DRAWINGS

The structure, operation, and advantages of the invention will become further apparent upon consideration of the following description taken in conjunction with the accompanying drawings, wherein.

DEFINITIONS

"Apex" means an elastomeric filler located radially above the bead core and between the plies and the turnup plies.

"Aspect ratio" means the ratio of the section height of a tire to its section width; also refers to the cross-sectional profile of the tire; a low-profile tire, for example, has a low aspect ratio.

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt structure" or "reinforcement belts" or "belt package" means at least two annular layers or plies of parallel cords, woven or unwoven, underlying the tread, unanchored to the bead, and having both left and right cord angles in the range from 18° to 30° relative to the equatorial plane of the tire.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "tire crown" means the tread, tread shoulders and the immediately adjacent portions of the sidewalls.

"Equatorial plane" means the plane perpendicular to the tire's axis of rotation and passing through the center of its tread; or the plane containing the circumferential centerline of the tread.

"EMT" means "extended mobility tire," which means the same as "runflat tire."

"Footprint" means the contact patch or area of contact of the tire tread with a flat surface at zero speed and under normal load and pressure.

"Gauge" refers to thickness measurement.

"Inner liner" means the layer or layers of elastomer or other material that form the inside surface of a tubeless tire and that contain the inflating fluid within the tire.

"Insert" means the same as "wedge insert," which is the crescent- or wedge-shaped reinforcement typically used to reinforce the sidewalls of runflat-type tires; it also refers to the elastomeric non-crescent-shaped insert that underlies the tread.

"Lateral" means a direction parallel to the axial direction.

"Moment of inertia" or "structural moment of inertia" refers to the structural rigidity of a beam section or other structure such as, specifically, the sidewall of a tire. A structure, such as a tire sidewall, having a high moment of inertia is more rigid than a similar structure having a lower moment of inertia.

"Normal inflation pressure" means the specific design inflation pressure at a specified load assigned by the appropriate standards organization for the service condition for the tire.

"Normal load" means the specific design inflation pressure and load assigned by the appropriate standards organization for the service condition for the tire.

"Ply" means a cord-reinforced layer of rubber-coated parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane of the tire. "Radial ply tire" means a belted or circumferentially-restricted pneumatic tire in which at least one ply has cords which extend from bead to bead and are laid at cord angles between 65° and 90° with respect to the equatorial plane of the tire.

"Runflat" or "runflat tire" is a pneumatic tire that is designed to provide limited service while uninflated or underinflated.

"Section height" means the radial distance from the nominal rim diameter to the outer diameter of the tire at its equatorial plane.

"Section width" means the maximum linear distance parallel to the axis of the tire and between the exterior of its sidewalls when and after the tire has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "tangentially" refer to segments of circular curves that intersect at a point through which can be drawn a single line that is mutually tangential to both circular segments.

"Tread cap" refers to the tread and the underlying material into which the tread pattern is molded.

"Tread width" means the arc length of the tread surface in the plane which includes the axis of rotation of the tire.

DETAILED DESCRIPTION OF THE PREFERRED EMBODIMENT

Figure 1:
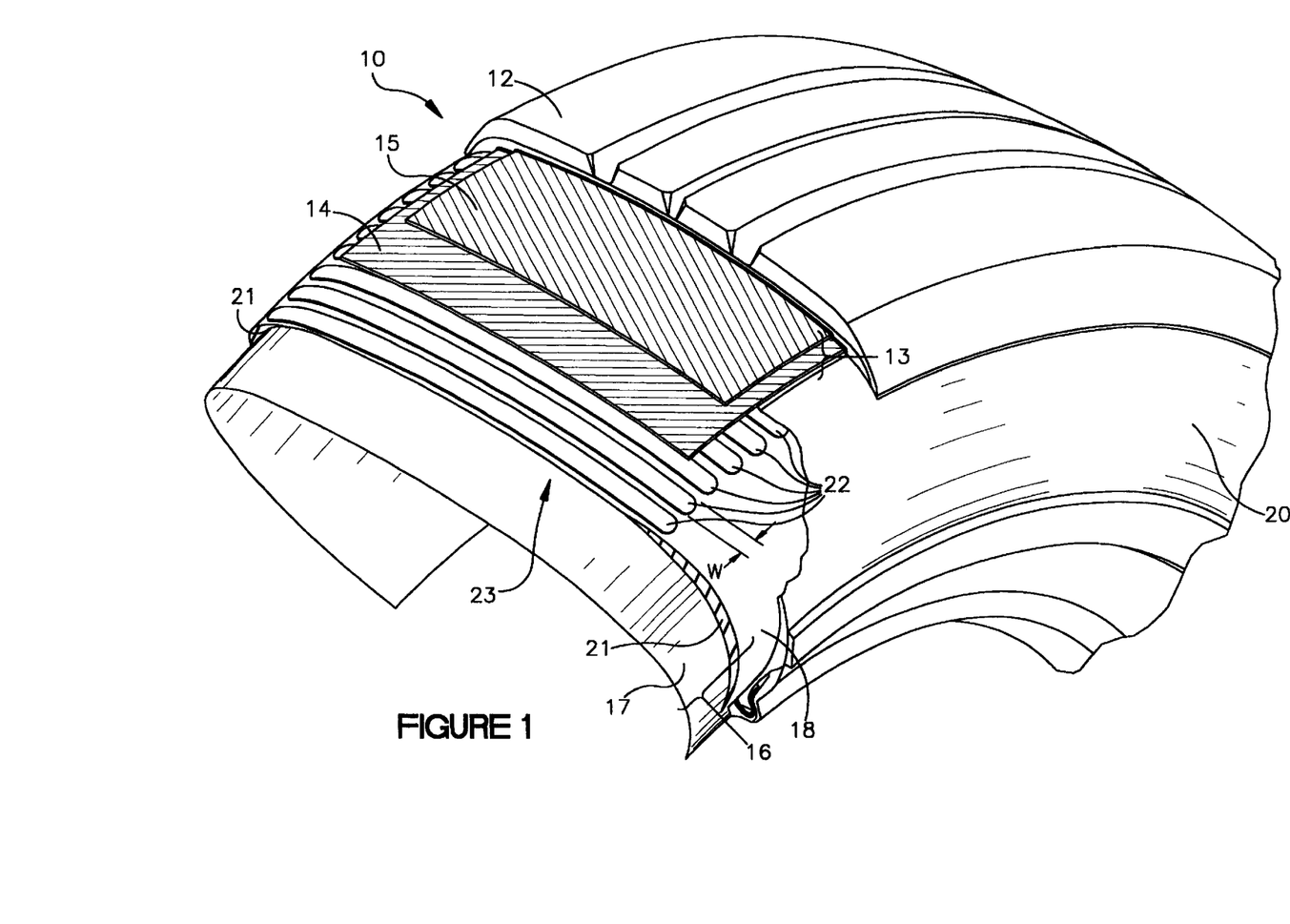
FIG. 1 is an oblique cut-away view of a radial ply tire showing the location of the present invention in relation to the tread and its underlying structures.

With reference to FIG. 1, a pneumatic tire 10 according to the invention is illustrated. The tire 10 maybe a runflat tire which incorporates conventional tire components such as a tread 12, a belt structure 13 comprising reinforcing belts 14 and 15, a carcass ply structure 16 comprising one or more carcass plies 17,18, and two sidewalls 20. Other conventional tire components such as an apex and/or a chipper can also be included as well as such runflat tire components as one or more wedge insert reinforcements 21 in each sidewall. One novel feature of the tire 10 is the provision of support members 23, including a plurality of parallel-aligned ribs 22 aligned laterally across the tread width in a location that is radially inward of the belt structure 13 and typically radially inward of the tread 12 and the belt structure 13. Typically, the ribs are disposed in an elastomeric sheet (not shown) for handling and placement in the tire. The ribs 22 are semi-rigid structures built according to the methods described below. The role of the ribs 22 in the runflat tire is that of inhibiting lateral and circumferential tread lift during operation of the tire in the runflat mode.

The ribs 22 in FIG. 1 are shown to be disposed radially outward of the ply structure 16. However, as will become evident in the description that follows, the location of the ribs 22 is such that their greatest mechanical advantage in inhibiting treadlift will occur when the ribs are disposed as far as possible from the neutral bending axis, on its tensile-stress side, of the tread 12 and all its underlying structures. In other words, if the ribs 22 were to be disposed within the ply structure 16, say between any two of the one or more plies 17,18 of the ply structure, they would have greater mechanical advantage than were they to be disposed radially outward of the ply structure. On the other hand, the disposition of the ribs 22 in the location shown in FIG. 1 is a very practical location from the point of view of manufacturing simplicity. Clearly, if the ply structure 16 comprises only a single carcass ply, the ribs 22 would be deployed radially outward of that single ply and beneath the belt structure 13. From a manufacturing-practicality point of view, the preferred location of the ribs 22 is radially inward of the belt structure 13 and radially outward of the ply structure 16. It is also within the terms of the present invention to place the ribs 22 in the crown region radially outward of the belt structure 13 and below the tread 12.

One important advantage of the invention is the possibility of eliminating tire components due to the presence of the ribs 22. Examples of tire components that might be eliminated include third belts and/or massive tread-stiffening wedge inserts beneath the tread. Secondarily, a well-stiffened tread tends to cause the sidewalls to standup more vertically during runflat operation, allowing for the possibility of using less sidewall reinforcing material. Thus, although the ribs 22 can coexist with conventional tire components, it is possible to improve the runflat handling of a vehicle equipped with tires incorporating the present invention and also to improve upon the runflat service life of a runflat tire having less, total mass than currently produced runflat tires. That is, the ribs 22 have the potential to provide a runflat tire that is lighter in weight than a corresponding runflat tire incorporating such other tread-strengthening structures as "tread wedges" disclosed in PCT/US98/06004 to minimize tread lift during runflat operation.

The light weight and low mass of the ribs 22 has the additional benefit, compared to other more massive ways to make the tread rigid, of providing a rigid tread structure having minimum potential for flexure-induced heat buildup during runflat operation.

Rib Structure, Materials, and Dimensions

The preferred structure of each rib 22 is a monolithic, fiber-reinforced (or fiber-filled) plastic material. The plastic matrix of the fiber-reinforced material could be a thermoplastic from the class of materials that includes polyetherimide, polyetheretherketone and polyphenylene sulfide or a thermoset material such as epoxy or polyester. The fiber-reinforcing materials are of a class of materials including carbon fiber, fiberglass and aramid filaments. The fiber reinforcing materials are filaments that are preferably unidirectional, being parallel aligned with the axis along the length of rib 22. The preferred formulation for the monolithic rib 22 would be between 30 percent and 70 percent by weight of the fiber reinforcing materials and the remainder primarily being the plastic matrix although the proportions of the respective matrix and reinforcing materials would of course be dictated by the specifically intended tire use application.

It is also within the terms of the invention to form the rib 22 out of cross ply laminate to provide strength and crack resistance in the transverse direction.

It is also within the terms of the invention to form the rib 22 of a semi-rigid, homogenous material plastic such as nylon, which have good adhesion to rubber and inhibit the lateral and circumferential tread lift during runflat operation of the tire.

Figure 2:
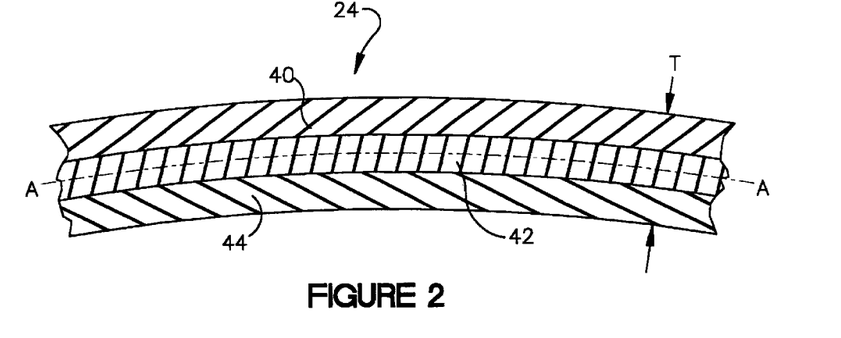
FIG. 2 is a schematic sectional view of a layered version of the tread reinforcing ribs of the present invention.

FIG. 2 shows an alternative design for support members 23 in which ribs 22 are replaced with ribs 24 that have a layered structure. In this alternative embodiment, each rib 24 has first, second and third layers 40,42,44, respectively. The first layer 40 and the third layer 44 are made of a fiber reinforced plastic matrix having the same composition and a formulation of the sorts listed above for the monolithic rib 22. That is, the first layer 40 and the third rib layer 44 are to be made of a composite material between 30 percent and 70 percent by weight of the fiber reinforcing materials and the remainder primarily being the plastic matrix although the specific composite design will be dictated by the specific application. The inventor acknowledges the possibility that the materials used to make the first layer 40 might be different from those used to make the third layer 44, accordingly as an optimized design of the rib structure 24 might require.

As for the intervening second layer 42 of the three-layered rib 24 shown in FIG. 2, the material would be an elastomer having a modulus of elasticity of between 300 psi (2.1 MPa) and 3,000 psi (21 MPa). The use of an elastomeric material for the second layer 42 would absorb the shear stresses which reach their highest magnitude at the neutral axis A—A. By configuring the layered rib 24 so that it has the three layers 40,42,44 made of the materials described above, the preferred outer first and third layers 40,44 provide the requisite stiffness to stiffen the tread 12 against tread lift during runflat operation while the elastomeric second layer 42 enables the ribs to reliably endure the shear stresses associated with the inevitable tread deflections associated with both normal-inflated operation of the tire 10 and especially with runflat operation of the tire.

The plastic matrix materials employed in the first layer 40 and the third layer 44 of each layered rib 24 are such that the modulus of elasticity of the plastic matrix material of the first layer 40 and the third layer 44 is between 150,000 psi (1050 MPa) and 650,000 psi (4550 MPa). The fiber filaments of reinforcing materials within the rib 24 are preferably unidirectional, being aligned with the axis extending along the length of the rib 24. However, it is within the terms of the present invention that the filaments be disposed within a range of about 0° to 45° with respect to the axis or length of the rib 24. With regard to the preferred monolithic or non-layered rib 22, the same materials considerations also apply.

In the remaining portion of this description of this tread-reinforcing rib invention, the designation number 22, from FIG. 1, will be used in reference to all such reinforcing ribs, whether of the layered-structure formed rib 22 (FIG. 2) or the monolithic-structure formed rib 24. However for purposes of understanding the structural relationships of the ribs, both are substantially the same.

There will be a preferred rib thickness to prevent tire lift based on tire size, tread width and load capacity. The width of each rib 22 can vary, but will range between 0.150" and 1.50". If the width is too large it will interfere with the smooth entry into contact with the road and a smooth exit from contact with the road.

While the overall length of each rib 22 will depend on the specific tire in each application, the length of each rib 22 within a given tire is between 50 percent and 110 percent of the maximum width of the belt structure 13. If the length of each rib 22 were more than 110 percent greater than the maximum width of the belt structure, then it would be forced to follow a small radius of curvature at both edges. This would create an undersiable high level of stiffness in the tread shoulder regions. If the ribs 22 were less than about 50 percent of the maximum width of the belt structure 13, the ribs would not effectively restrict the lift off in the footprint area. The materials contemplated for use in the construction of the ribs 22 having the requisite strength and rigidity to inhibit tread lift during runflat operation of the tire 10 will be, of course, a function of the tire designer's need to meet the runflat structural needs with an acceptable degree of normal-inflated riding comfort and vehicle handling.

The minimum preferred circumferential spacing between each rib 22 (as shown in FIG. 1) is a function of the smooth entry into and out of contact of the tread with the road surface. Larger rib widths will use larger spacing between ribs. Therefore, a wide range of between 15 percent and 200 percent of the width W of the rib(s) on either side of the spacing. Thus several hundred ribs 22 might be used in a given single-tire application. However, the specific number of the ribs 22 placed in a given tire would, of course, be determined according to the dimensions and the tensile and bending strengths of each particular rib of each particular set of ribs in a tire and the load requirement of the particular vehicle and intended use of the tire.

The rib can be straight or have a curvature. The curvature can follow the natural ply line or have a higher radius at either end. Another function of the plurality of ribs 22,24 is to prevent puncture protection against cuts and objects on the road.

Dynamics of Operation of the Invention

The plurality of tread-reinforcing support members 23, whether they are monolithic ribs 22 or layered ribs 24 according to the above described three-layered design, have two modes of operation in providing a tread-lift-inhibiting stiffening influence upon the tread 12 of the tire 10. One mode derives from the inherent stiffness of the proposed composite material of which the ribs 22,24 are made. In other words, the ribs 22,24 are, by their structure alone, inherently semi-rigid. The other mode by which the ribs 22,24 serve to inhibit tread lift involves a combination of high longitudinal tensile-stress-bearing strength of the ribs due to the use of such high-strength and high-modulus filler materials as glass or carbon fibers and to the intended disposition of the ribs in a location that is radially inward of the tread 12 and the belt structure 13. In that location, radially inward of the belt structure, the ribs will be exposed to tensile stresses that will necessarily arise upon upward deflection of the central portion of the tread during runflat operation. More specifically, the latter mode of stiffening can be described in terms of an analogy involving an I-beam, as discussed below.

Figure 3:
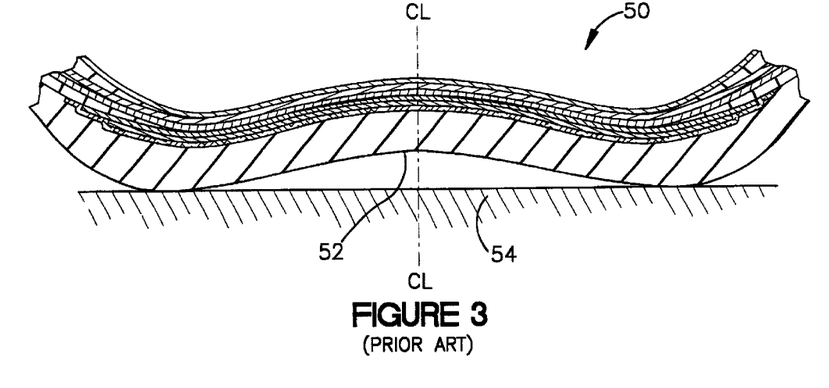
FIG. 3 is a fragmentary cross-sectional view of a prior art upward-buckled tire tread.
Figure 4A:
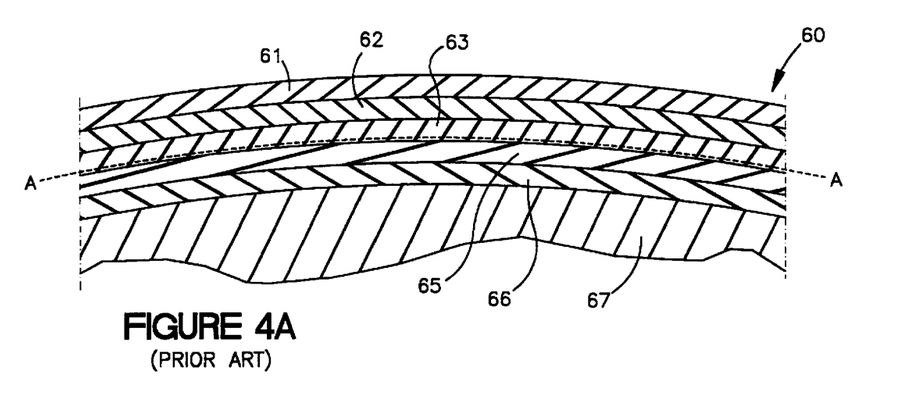
FIG. 4A is a fragmentary cross-sectional view of the central portion of the tread section shown in FIG. 3.

FIG. 3 shows a fragmentary cross-sectional view of the ground-contacting portion of a prior art tire tread 50 undergoing lateral tread lift. The central tread portion 52 is shown to be out of contact with the ground 54. FIG. 4A is a fragmentary cross-sectional view of the central most portion 60 of the tread section 50 shown in FIG. 3. The tire components shown in FIG. 4A are the inner liner 61, a first carcass ply 62, a second carcass ply 63, a first belt 65, a second belt 66, and a portion of the tread 67. The neutral bending axis A—A is shown close to the interface between the second ply 63 and the first belt 65, which is not necessarily the precise location of the neutral bending axis, though, for the purposes of explaining the tread-stiffening dynamics of the invention, that location of the neutral bending axis will suffice. The structures shown lying above the neutral bending axis A—A, such as the carcass plies, are in tension, while those lying below the neutral axis, including the belts 65,66 are in compression.

Figure 4B:
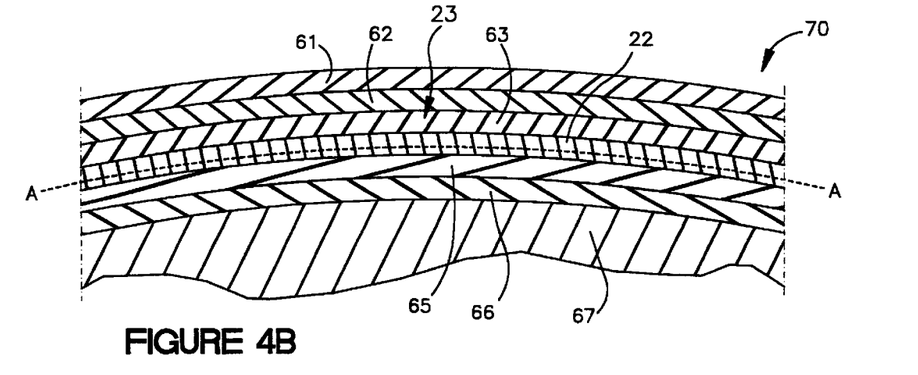
FIG. 4B is a fragmentary cross-sectional view of the central portion of the tread section of the present invention, with the tread-reinforcing rib in place.

FIG. 4B includes all of the structure shown in FIG. 4A, with a tread-reinforcing support member 23 (either tread-reinforcing rib 22 or 24) disposed in the location between the second carcass ply 63 and the first belt 65. In FIG. 4B, the neutral bending axis A—A is shown displaced slightly away from the belts 65,66, as compared with the prior art construction, due to the presence of the rib 22. The presence of the rib 22 causes the location of the neutral bending axis A—A to move slightly radially inward and away from the radially inwardmost portion of the first belt 65. Thus each such rib 22 is shown to be located primarily on the tensile-stress side of the neutral bending axis, though in reality, given such other factors as the actual thickness and compression-bearing properties of the belts or the thickness and strength of the ply layers, each rib might lie entirely on the tensile-stress side of the neutral bending axis A—A. In that location, the tensile-stress-bearing capacity of the ribs comes in to play in stiffening the tread in ways described more fully below.

As described earlier, the stiffening effect conferred upon the tread by the ribs 22 derives from (1) the inherent stiffness of the fiber-reinforced composite structure of the rib material and (2) the tensile-stress-bearing strength of the rib in its location on the tensile-stress side of the neutral bending axis. In fact, upon contemplation of FIG. 4B, the presence of the rib 22 in the location shown is such as to have an additional mode of action in its tread-stiffening role. The presence of the rib 22 displaces the compression-stress-bearing belt layers 65,66 farther from the tensile-stress-bearing ply layers 62,63, which confers upon those respective structures a greater moment arm of influence with respect to the neutral bending axis A—A. More specifically, the I-beam analogy mentioned earlier comes into play and can be visualized by referring to FIG. 5.

Figure 5:
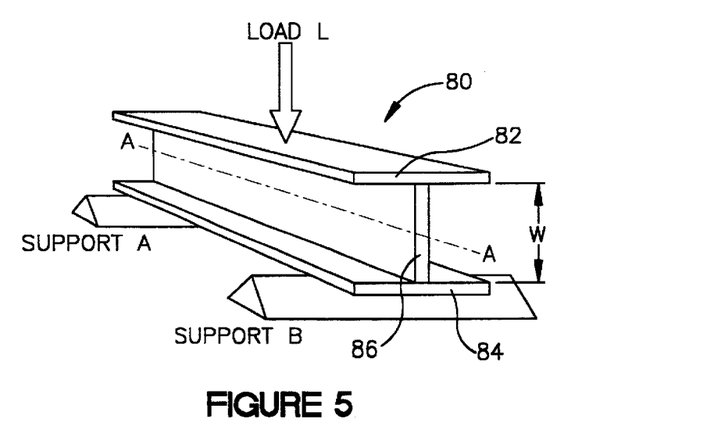
FIG. 5 shows and I-beam analog of a tread structure.

The I-beam 80 shown in FIG. 5 spans a region between a support A and a support B while bearing a load L. The upper flange 82 is thus the primary compression-stress-bearing component of the I-beam 80, along with those portions of the web 86 lying on the compression side of the neutral bending axis A—A. Correspondingly, the flange 84 and the portions of the web 86 lying below the neutral bending axis are in tension. In the analogy to the tread segment 70 shown in FIG. 4B, the compression-bearing flange 82 of the I-beam 80 corresponds to the belts 65,66 in FIG. 4B while the tensile-stress-bearing flange 84 corresponds to the radial plies 62,63. Given these analogous correspondences, the presence of the rib 22 (FIG. 4B) has the effect of increasing the width W of the I-beam's web 86. In other words, if the fragmentary tire section 70 shown in FIG. 4B were considered as an I-beam, the rib 22, because of its thickness, has the effect of increasing the web's width W. Those skilled in the tire building arts will of course recognize that an increase in the width of the web of an I-beam will correspond to an increase the I-beam's bending moment of inertia because the respective moment arms of the stress-bearing flanges 82,84 will be increased with respect to the neutral bending axis A—A. In addition, the tensile-stress-bearing capacity of each rib 22, as well as its presence primarily on the tensile-stress side of the neutral bending axis A—A (FIG. 4B), has the effect of increasing the total cross-sectional area of the tensile-stress-bearing portions of the analogous I-beam 80 shown in FIG. 5.

Preferred Embodiment

Figure 6:
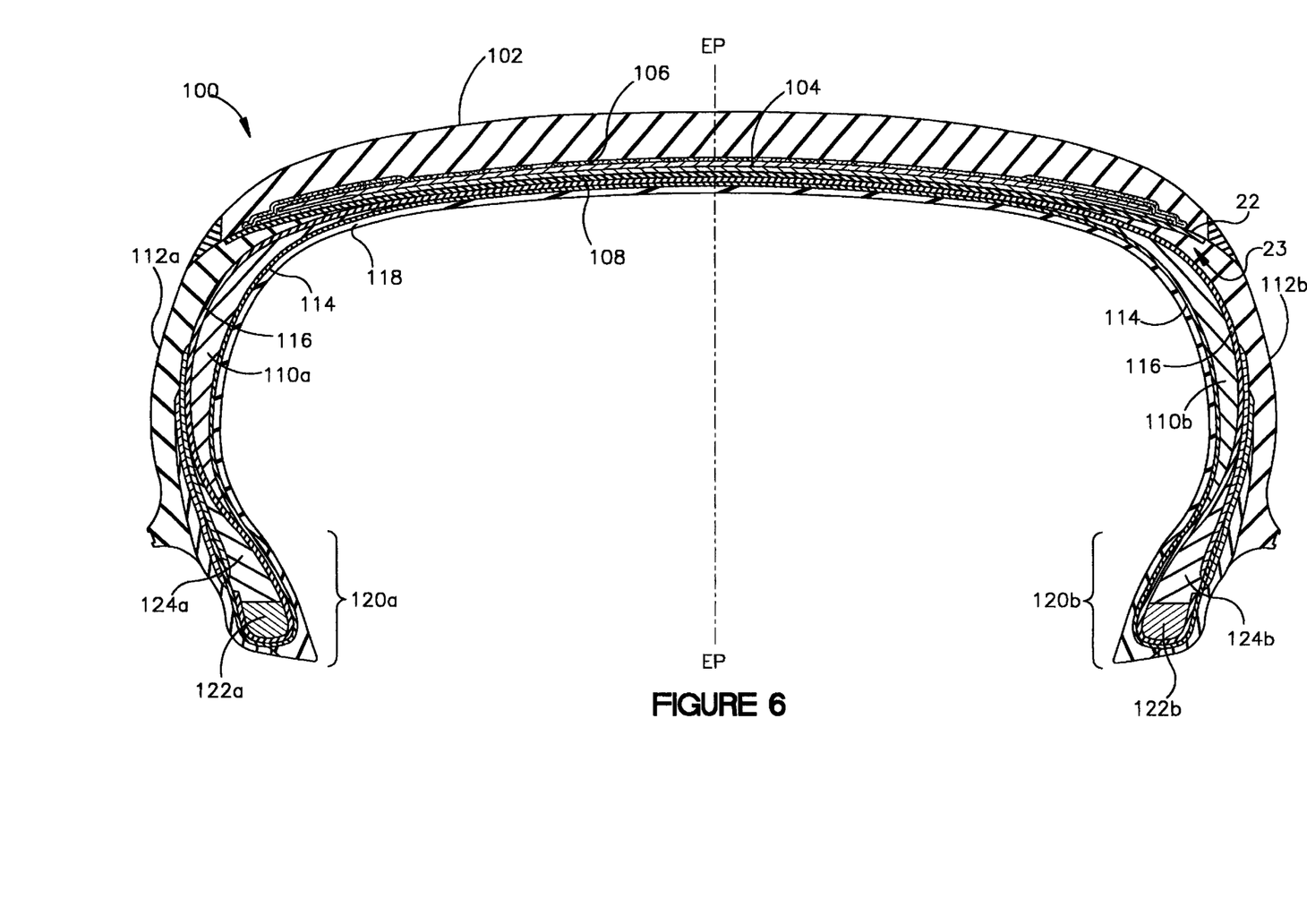
FIG. 6 is cross-sectional view of an alternative embodiment of the invention.

FIG. 6 is a meridional cross-sectional view of a runflat tire 100 incorporating a plurality of support members 23 such as parallel-aligned ribs 22 or 24 beneath a tread 102 in the location that is radially inward of the belt structure 104 (shown with a fabric overlay 106) and radially outward of the ply structure 108. (FIG. 6 is essentially a meridional cross-sectional view of a specific tire 100 that is equivalent to the more generalized tire 10 of FIG. 1.) The runflat tire 100 has such additional tire components as the one or more wedge inserts 110a,110b in each sidewall portion 112a,112b, as well as one or more radial carcass plies 114,116, inner liner 118, and bead regions 120a,120b comprising beads 122a,122b and bead apexes 124a,124b.

While the embodiment shown in FIG. 6 (and FIG. 1) is intended to represent a more or less typical runflat tire incorporating the ribs 22 of the present invention (which inhibit lateral and circumferential tread lift during runflat operation), the embodiment of the present invention described above and shown in FIG. 6 is intended only to indicate a typical rather than specific mode of deployment of the invention which could as well be incorporated within the designs of the many other designs of runflat tires as presently exist or as could plausibly be anticipated within the realm of runflat tire technology.

Furthermore, the design geometry of the ribs 22 and their layout within a given tire is a function of the tire size, aspect ratio and intended use. The inventor anticipates that the ribs 22,24 could be used as a means to provide strength and reduce the mass or number of other tire components in a wide variety of tire designs including those intended not only for passenger cars but also earthmovers, aircraft and both light and heavy trucks. The range of width, thickness, length and spacing in each of the tire designs would vary in accordance with numerous other tire design parameters and intended tire end-use modes.

While the invention has been described with reference to a preferred embodiment, modifications and alterations will occur to others upon a reading and understanding of this specification which is intended to include all such modifications and alterations insofar as they come within the scope of the appended claims or the equivalents thereof. Thus while the invention has been described in combination with a specific embodiment, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply runflat tire having a tread, two inextensible annular beads, a carcass ply structure comprising one or more radial plies, a belt structure located between the tread and the ply structure, an inner liner, and two sidewalls each reinforced by at least one wedge insert, the tire being characterized by:
   a plurality of parallel-aligned, circumferentially spaced, rib shaped support members lying laterally across and radially inward of the tread.

2. The tire of claim 1 characterized in that the plurality of parallel-aligned support members are disposed between the tread and the belt structure.

3. The tire of claim 1 characterized in that the plurality of parallel-aligned support members are radially inward of the belt structure.

4. The tire of claim 1 characterized in that the parallel-aligned, support members are ribs having a length equal to between about 50 percent and 110 percent of the width of the belt structure.

5. A pneumatic radial ply runflat tire having a tread, two inextensible annular beads, a carcass ply structure comprising one or more radial plies, a belt structure located between the tread and the ply structure, an inner liner, and two sidewalls each reinforced by at least one wedge insert, the tire being characterized by:
   a plurality of parallel-aligned, support members lying laterally across and radially inward of the tread; and
   characterized in that the parallel-aligned, support members are ribs having a length equal to between about 50 percent and 110 percent of the width of the belt structure; and
   characterized in that each of the ribs is a monolithic, fiber-reinforced plastic material.

6. The tire of claim 5 characterized in that the plastic material has a plastic matrix selected from the group comprising a thermoplastic from the class of materials comprising polyetherimide, polyetheretherketone and polyphenylene sulfide or a thermoset from the class of materials comprising epoxy and polyester.

7. The tire of claim 6 characterized in that the fiber-reinforcing materials are of the class of materials comprising carbon fiber and fiberglass.

8. The tire of claim 7 characterized in that the preferred formulation of the fiber-reinforced plastic material is between 30 percent and 70 percent by weight of the fiber reinforcing material and the remainder plastic matrix.

9. A pneumatic radial ply runflat tire having a tread, two inextensible annular beads, a carcass ply structure comprising one or more radial plies, a belt structure located between the tread and the ply structure, an inner liner, and two sidewalls each reinforced by at least one wedge insert, the tire being characterized by:
   a plurality of parallel-aligned, support members lying laterally across and radially inward of the tread; and
   characterized in that the parallel-aligned, support members are ribs having a length equal to between about 50 percent and 110 percent of the width of the belt structure; and
   characterized in that each of the ribs is of a layered construction.

10. The tire of claim 9 characterized in that each of the ribs comprises first, second and third layers.

11. The tire of claim 10 characterized in that the first layer and the third layer of each of the ribs are made of a fiber-reinforced plastic material.

12. The tire of claim 11 characterized in that the plastic material of the first layer and the third layer of each of the ribs has a plastic matrix of a thermoplastic from the class of materials comprising polyetherimide, polyetheretherketone and polyphenylene sulfide and a thermoset from the class of materials comprising epoxy and polyester.

13. The tire of claim 12 characterized in that the fiber-reinforcing materials are of the class of materials comprising carbon fiber and fiberglass.

14. The tire of claim 11 characterized in that the preferred formulation of the fiber-reinforced plastic material is between 30 percent and 70 percent by weight of the fiber reinforcing material and the remainder plastic matrix.

15. The tire of claim 10 characterized in that the second layer between the first and third layers of each of the ribs is made of an elastomeric material.

16. The tire of claim 5 characterized in that reinforcing fibers within each of the ribs are preferably unidirectional, being aligned with an axis extending along the length of the ribs.

17. The tire of claim 11 characterized in that reinforcing fibers within the first layer and the third layer of the ribs are preferably unidirectional, being aligned with the axis along the length of the rib.

18. The tire of claim 5 characterized in that the thickness of each of the ribs is preferably between 10 percent and 45 percent of the width of the rib.

19. The tire of claim 5 characterized in that the circumferential spacing between each of the ribs is between 15 percent and 200 percent of the width of the ribs on either side of the spacing.

20. The tire of claim 5 characterized in that the plurality of support members are disposed within the ply structure.

* * * * *